(12) United States Patent
Casiddu

(10) Patent No.: US 10,143,329 B2
(45) Date of Patent: Dec. 4, 2018

(54) HORIZONTAL UNIT FOR MAKING BEVERAGES USING CAPSULES CONTAINING POWDERED FOOD SUBSTANCES

(71) Applicant: CAFFITALY SYSTEM S.P.A., Gaggio Montano (BO) (IT)

(72) Inventor: Franco Casiddu, Abbiategrasso (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 305 days.

(21) Appl. No.: 14/910,089

(22) PCT Filed: Jul. 31, 2014

(86) PCT No.: PCT/IB2014/063578
§ 371 (c)(1),
(2) Date: Feb. 4, 2016

(87) PCT Pub. No.: WO2015/019249
PCT Pub. Date: Feb. 12, 2015

(65) Prior Publication Data
US 2016/0174752 A1    Jun. 23, 2016

(30) Foreign Application Priority Data

Aug. 9, 2013   (IT) .............................. VR2013A0195

(51) Int. Cl.
*A47J 31/40*   (2006.01)
*A47J 31/36*   (2006.01)

(52) U.S. Cl.
CPC ......... *A47J 31/407* (2013.01); *A47J 31/3628* (2013.01)

(58) Field of Classification Search
CPC ........................... A47J 31/3628; A47J 31/407
(Continued)

(56) References Cited

U.S. PATENT DOCUMENTS 5,242,702 A   9/1993   Fond
5,472,719 A   12/1995  Favre
(Continued)

FOREIGN PATENT DOCUMENTS

EP   0 468 078 A1   1/1992
EP   0 507 905 B1   10/1992
(Continued)

*Primary Examiner* — Ibrahime A Abraham
*Assistant Examiner* — John J Norton
(74) *Attorney, Agent, or Firm* — Pearne & Gordon LLP

(57) ABSTRACT

A horizontal unit for making beverages includes a first part (4) and a second part (6) which are mobile between an operating position in which between them they form a chamber (8) for a capsule (2), and a capsule (2) insertion position in which they are separated. A beverage collection portion (14) includes a perforating element (44) mobile between an active position in which it perforates a capsule (2), and an inactive position. A hooking portion (46) is switchable between a hooking configuration in which it retains the perforating element in the active position and an unhooking configuration. During a movement of the first part and/or the second part from the insertion position to the operating position, the second part switches the hooking portion from the hooking configuration to the unhooking configuration, whilst during an opposite movement the second part moves the perforating element from the inactive position to the active position.

11 Claims, 15 Drawing Sheets

(58) Field of Classification Search
USPC .......................................................... 99/295
See application file for complete search history.

(56) References Cited

U.S. PATENT DOCUMENTS

| | | | |
|---|---|---|---|
| 6,792,980 B1 * | 9/2004 | Cortese | A47J 31/3628 |
| | | | 141/1 |
| 8,770,095 B2 * | 7/2014 | Pecci | A47J 31/3633 |
| | | | 99/295 |
| 9,635,973 B2 * | 5/2017 | Degli Esposti Venturi | |
| | | | A47J 31/407 |
| 9,788,683 B2 * | 10/2017 | Venturi | A47J 31/407 |
| 2010/0129512 A1 | 5/2010 | Accursi | |
| 2012/0199011 A1 | 8/2012 | Cheng | |

FOREIGN PATENT DOCUMENTS

| | | |
|---|---|---|
| EP | 2 000 063 A1 | 12/2008 |
| WO | 2012/158055 A1 | 11/2012 |

* cited by examiner

HORIZONTAL UNIT FOR MAKING BEVERAGES USING CAPSULES CONTAINING POWDERED FOOD SUBSTANCES

This invention relates to a horizontal unit for making beverages using capsules containing powdered food substances.

In particular, the units with a horizontal axis for which this invention is preferably intended, are devices which use water to extract the powdered food substance and which comprise a first part and a second part, at least one of which is mobile relative to the other along a horizontal line, between an operating position in which the two parts are coupled and between them form an extraction chamber in which the capsule can be retained, and a capsule insertion position in which they are distanced and allow a capsule to be inserted in the unit. In fact, in the insertion position, the capsule can be inserted using gravity from above until it reaches retaining means constituted of two converging lateral elements, which can then be spread apart during the unit closing step, to release the capsule in the housing.

Associated with the two mobile parts there are water injection means and beverage collection means operatively associated with the chamber for, respectively, sending water into the capsule contained in the chamber and collecting a beverage coming out of the capsule.

This invention is particularly intended for horizontal units which use capsules in which the wall through which the beverage comes out is closed and must therefore be perforated inside the unit.

At present, there are many different prior art solutions for piercing the bottom of the capsule.

In particular, in the most widespread solution, the capsule is pierced during unit closing by piercing spikes mounted in a fixed fashion inside the housing for the capsule, in a position such that they interfere with it.

There are also prior art solutions in which the bottom of the capsule is pierced only during extraction of the beverage, following the increase in pressure in the capsule which causes the bottom of the capsule to swell so that it is torn against a fixed piercing spike. The piercing spike may initially be distanced from the bottom (as described for example in patent EP 468078) or in contact with the bottom (patent EP 507905) or partly inserted in it.

A further solution is described in patent EP 2000063, and involves the use of a mobile blade which, once the capsule is positioned in the housing, is pushed against the bottom of the capsule to pierce it and which is then removed before extraction begins.

Amongst all of the prior art solutions, the Applicant believes that the solution described in patent EP 2000063 is the one which allows the best quality supply of espresso coffee. However, even that solution is not without disadvantages. In particular, if used with capsules made of plastic, under the action of the blade the bottom of the capsule may deform rather than being cut and the blade may therefore not pierce it correctly.

In this context, the technical purpose which forms the basis of this invention is to provide a horizontal unit for making beverages using capsules containing powdered food substances which overcomes the above-mentioned disadvantages.

In particular, the technical purpose of this invention is to provide a horizontal unit for making beverages using capsules containing powdered food substances which allows the bottom of the capsule to be perforated, in particular with a linear cut, in the best possible way.

The technical purpose specified and the aims indicated are substantially achieved by a horizontal unit for making beverages using capsules containing powdered food substances as described in the appended claims.

Further features and the advantages of this invention are more apparent in the detailed description below, with reference to several preferred, non-limiting embodiments of a horizontal unit for making beverages using capsules containing powdered food substances, illustrated in the accompanying drawings, in which.

Figure 6:
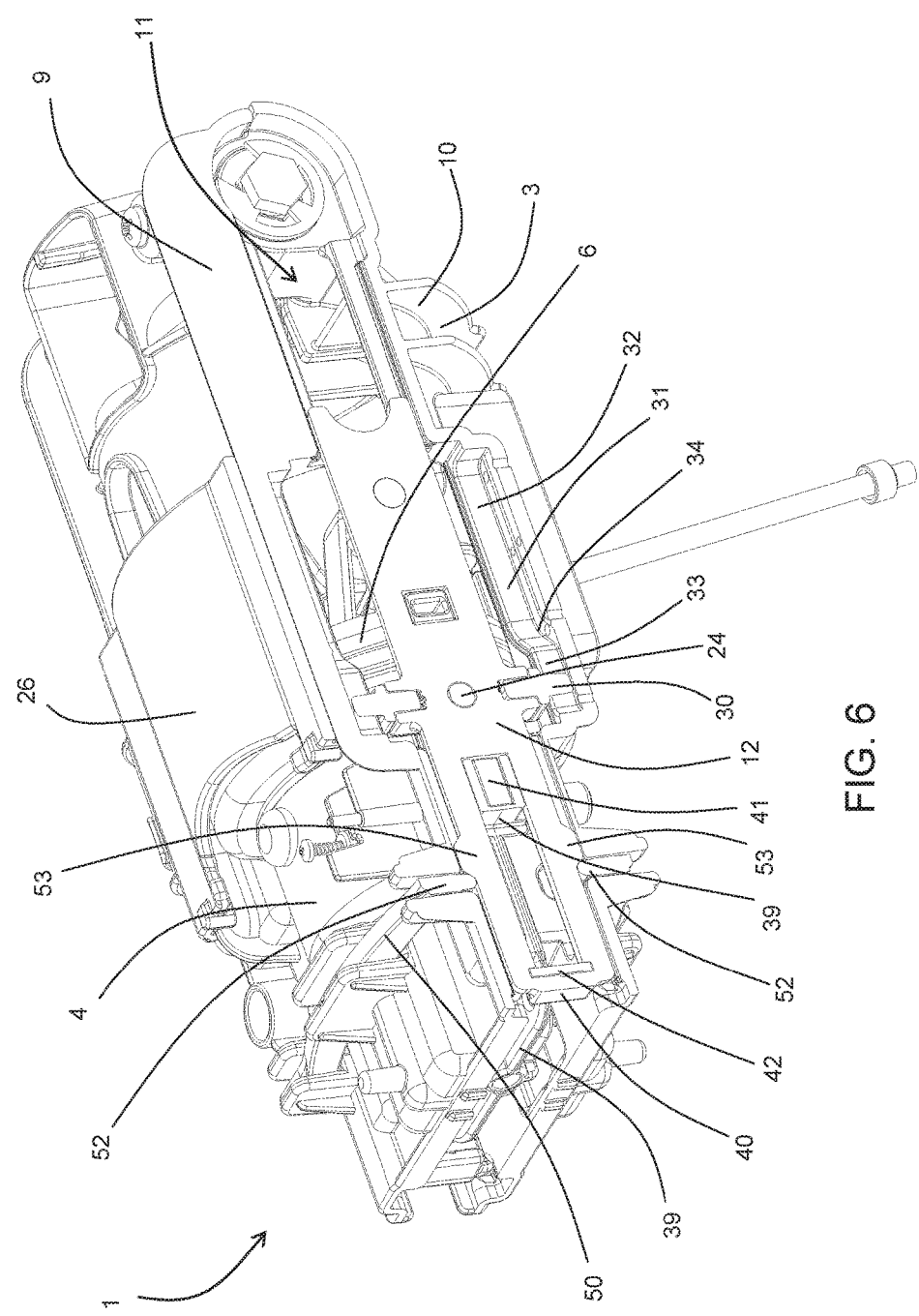
FIG. 6 is a section of the unit of FIG. 5 according to the line VI-VI of FIG. 13.
Figure 7:
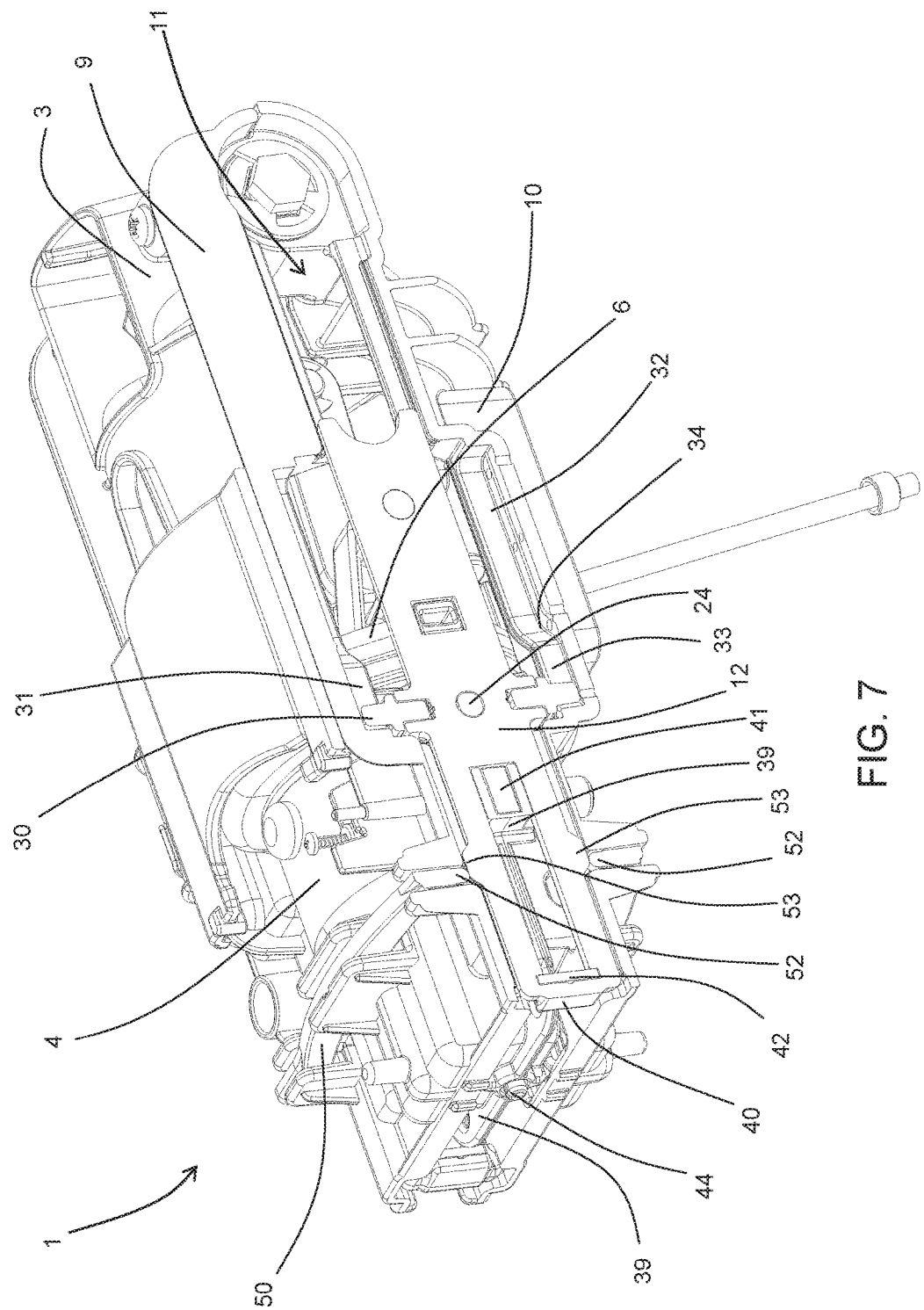
FIG. 7 shows the unit of FIG. 6 in a subsequent configuration towards the closed configuration.
Figure 9:
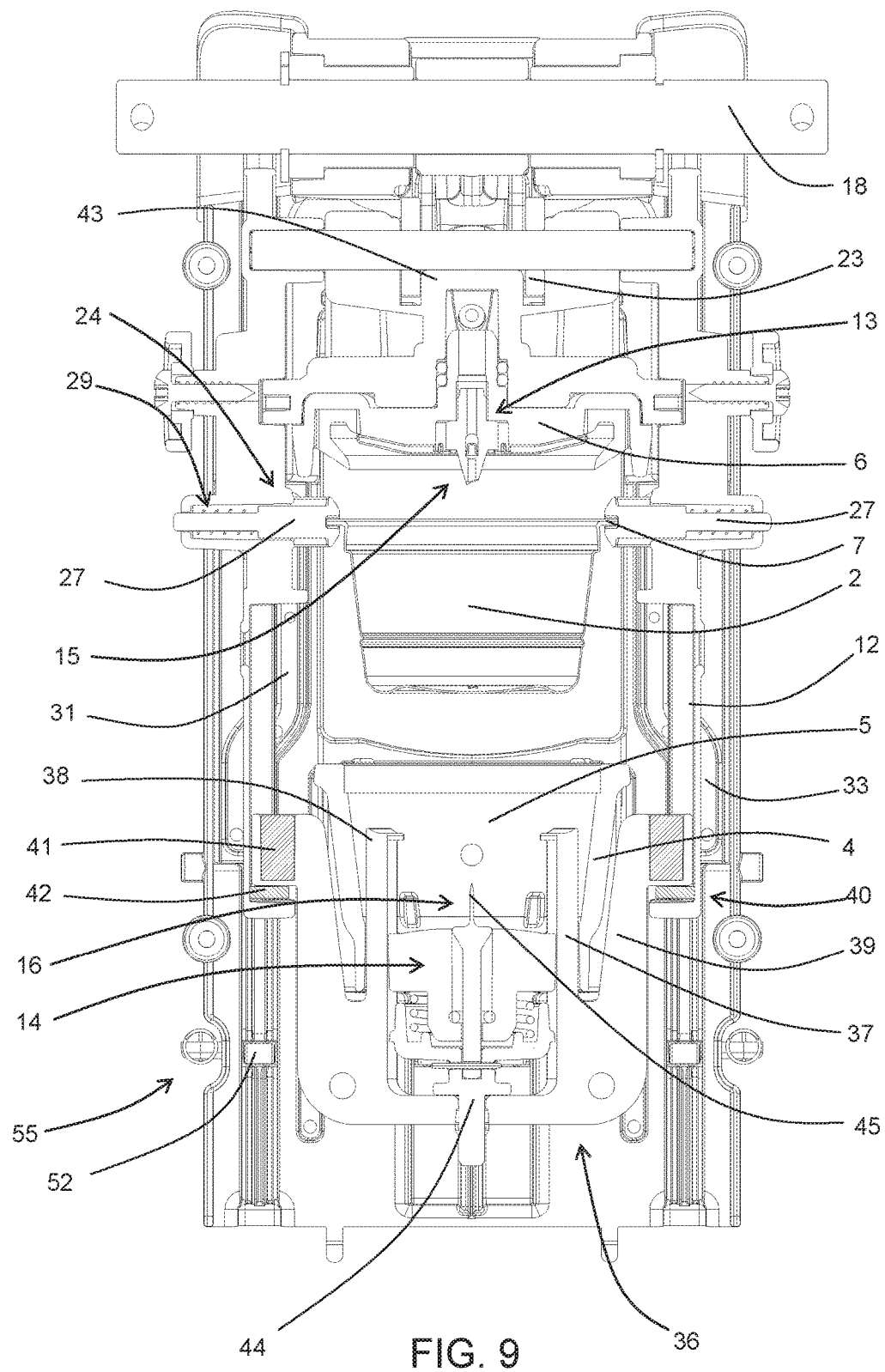
FIG. 9 is a section of the unit of FIG. 3 in a horizontal axial plane.
Figure 10:
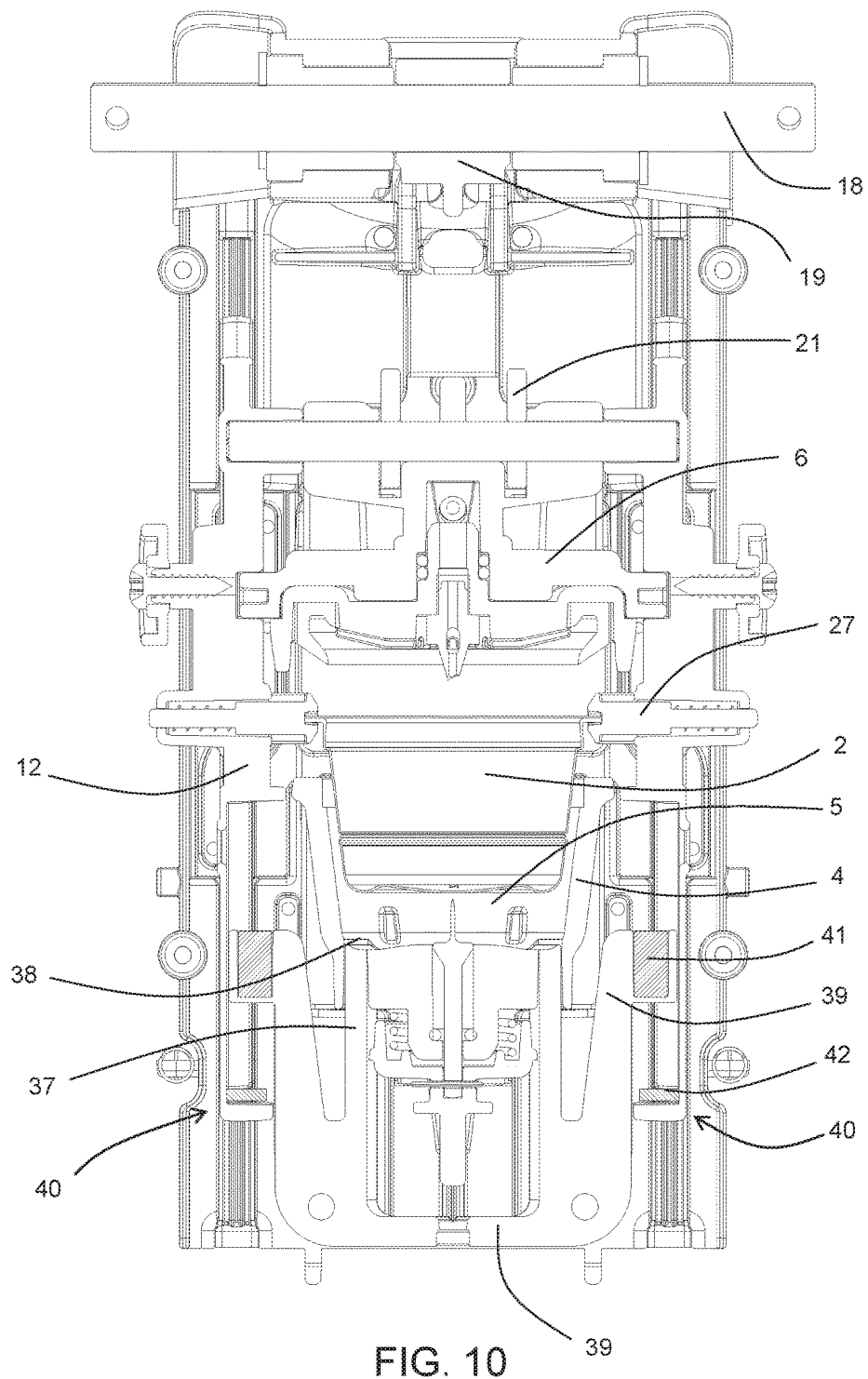
Figure 11:
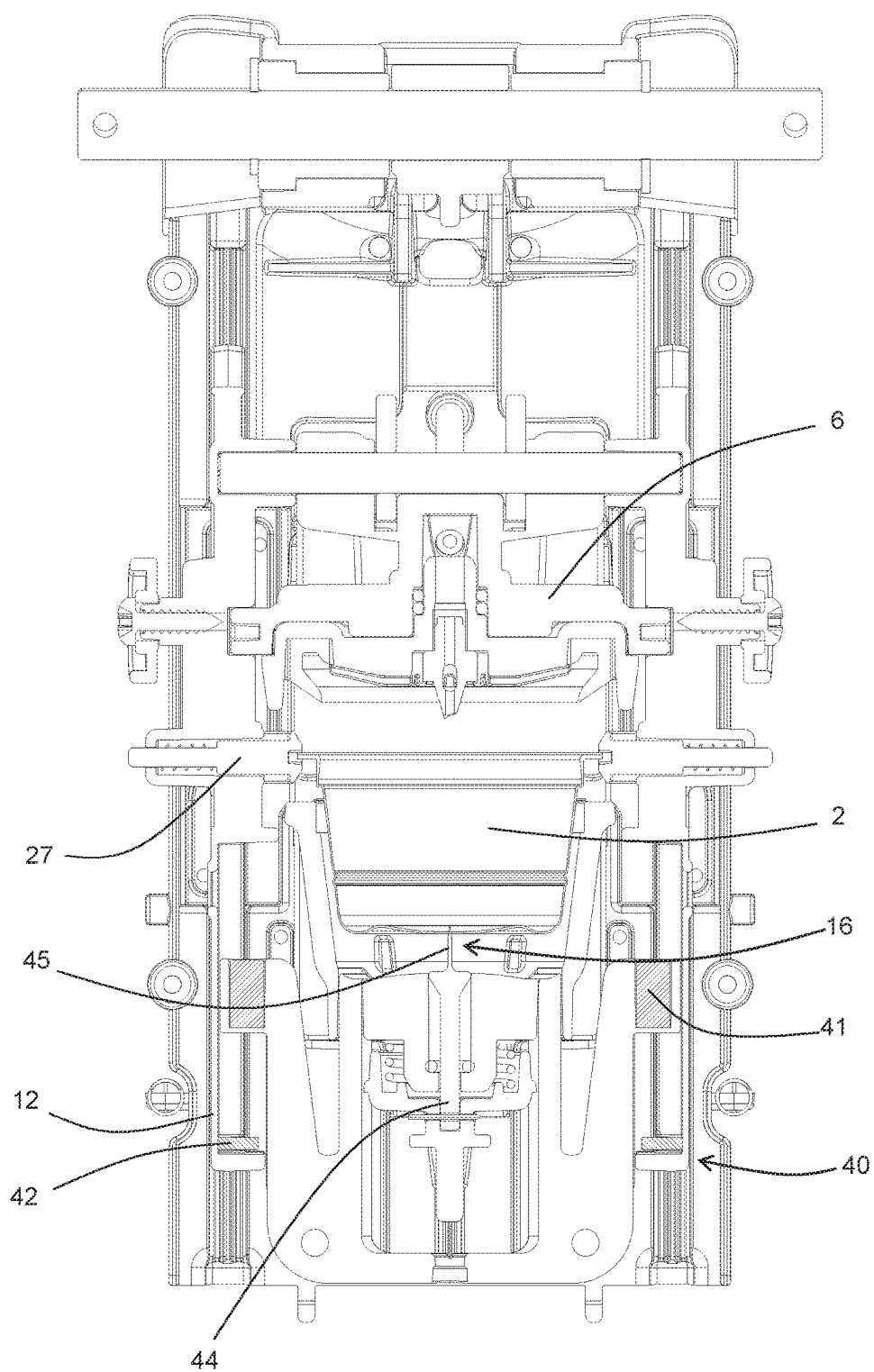
Figure 12:
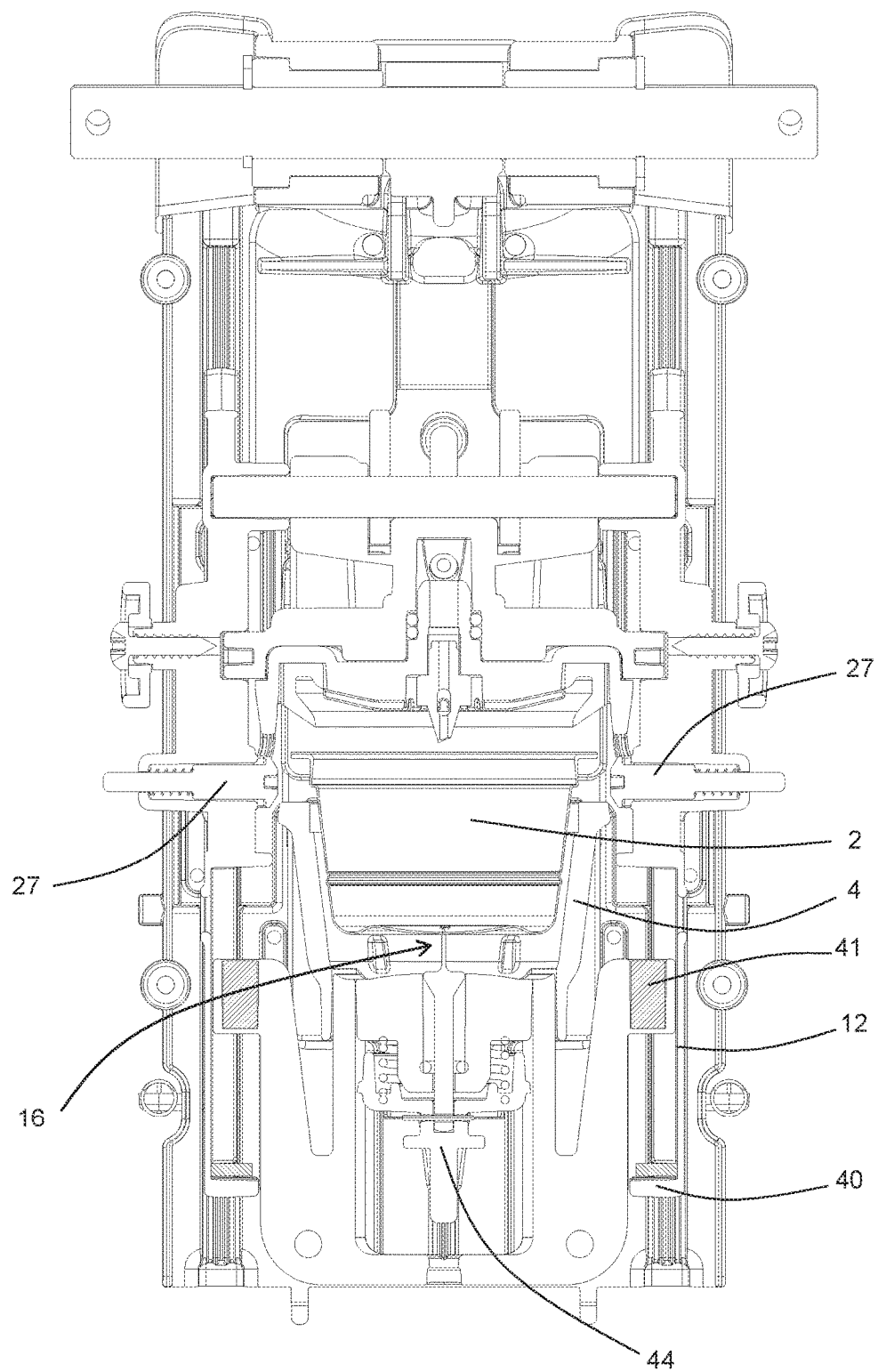
Figure 13:
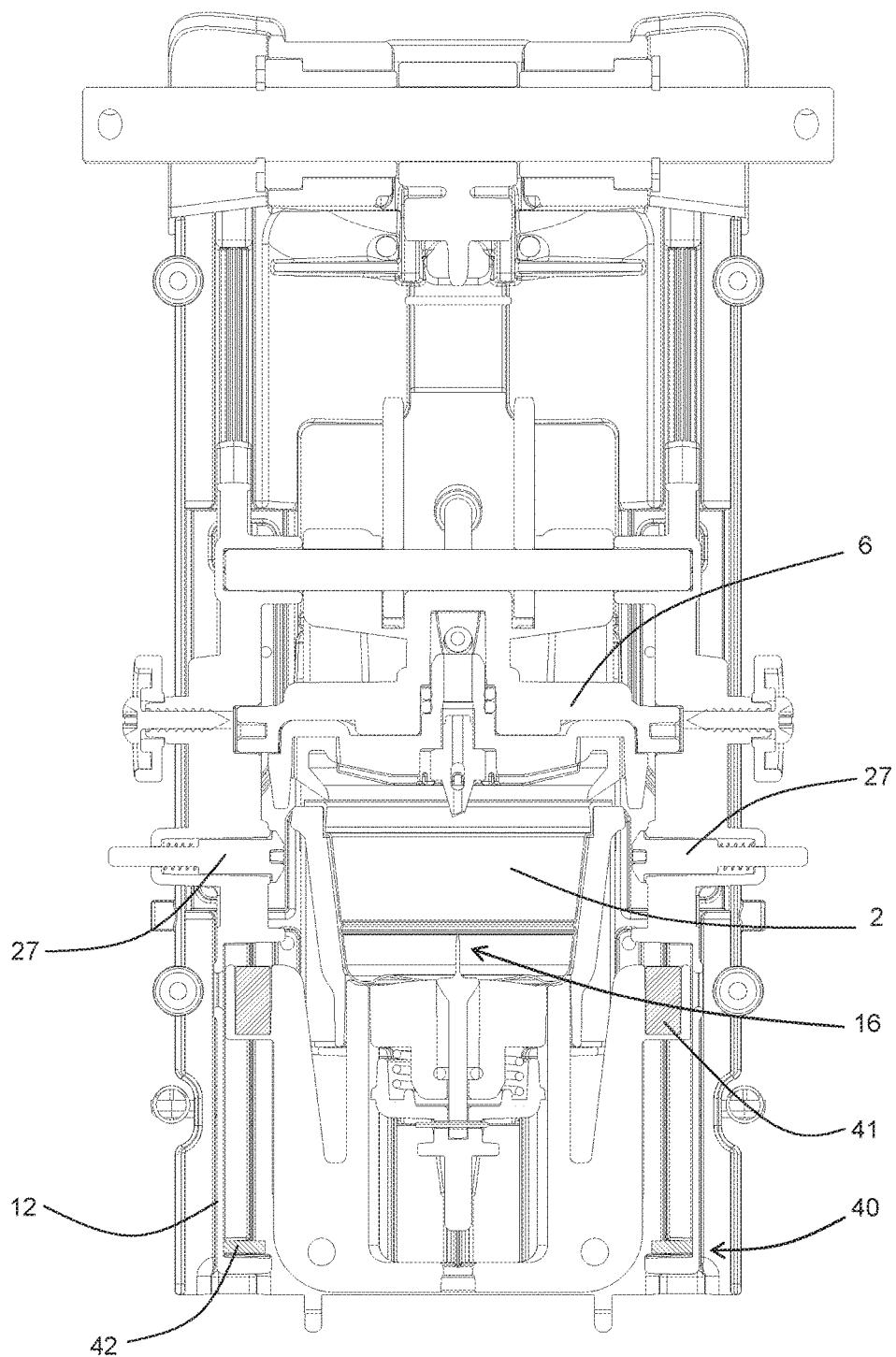
Figure 14:
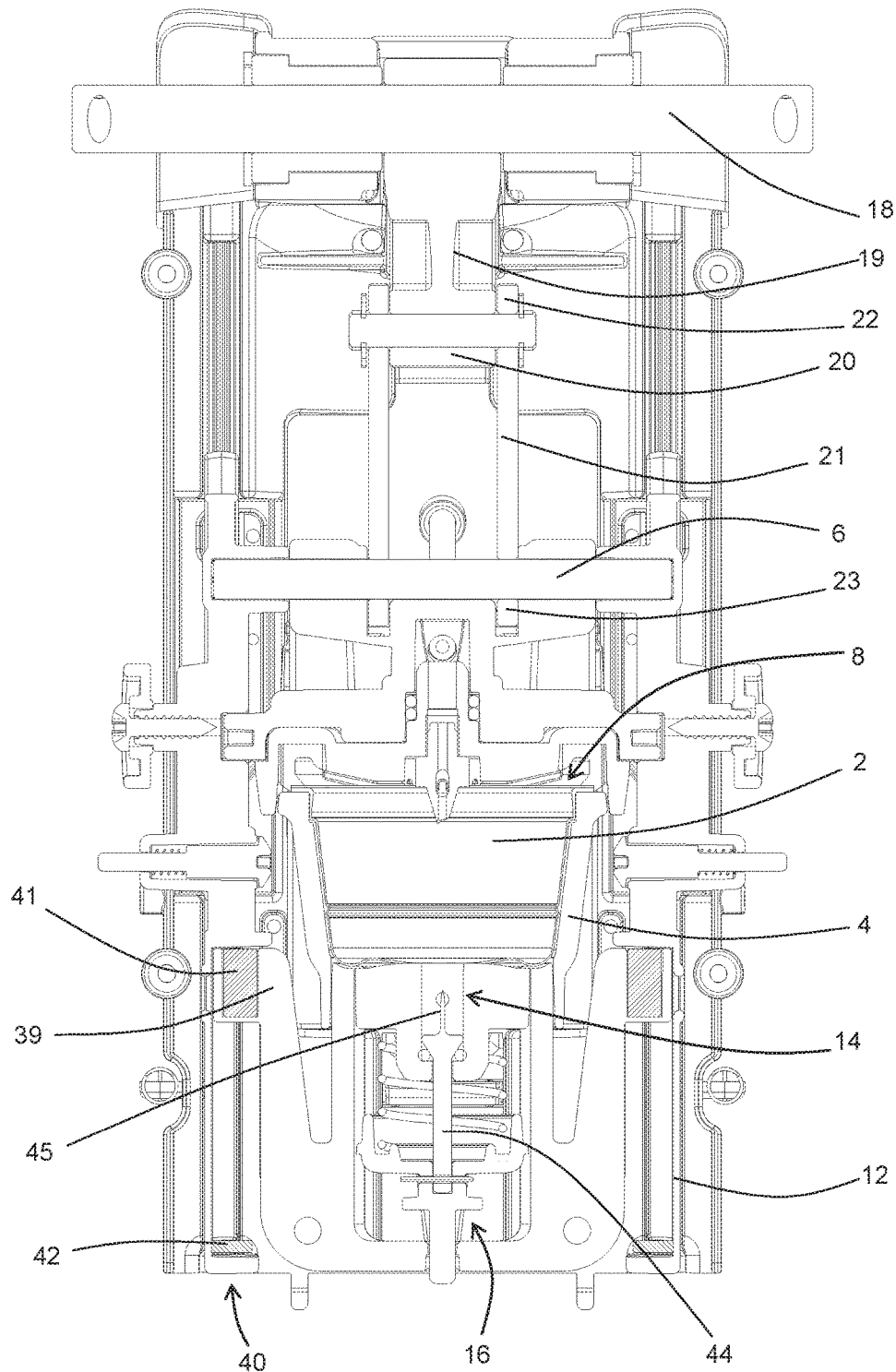
Figure 15:
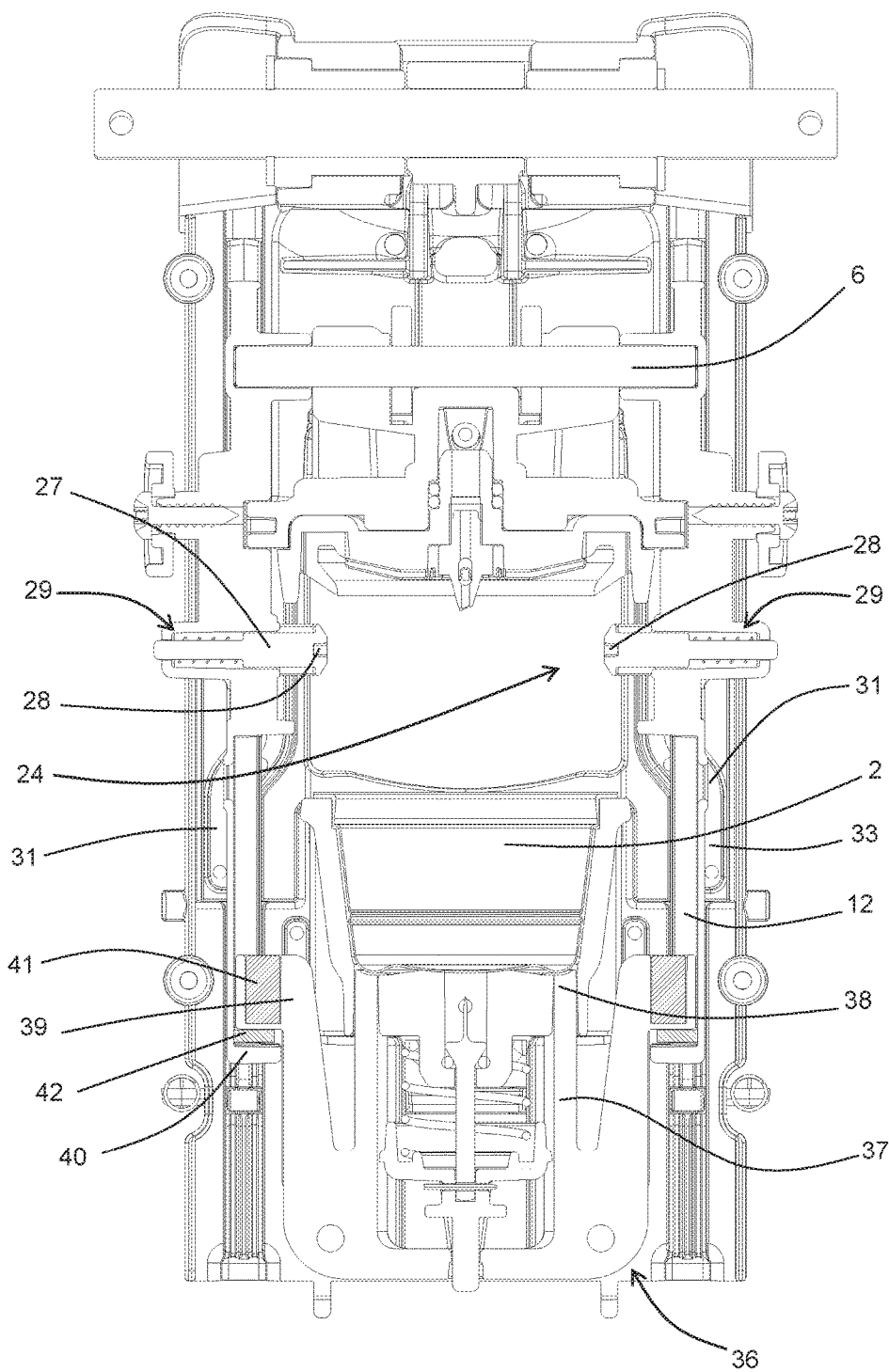

FIGS. 10 to 14 show various sequential steps of the passage of the unit of FIG. 9 from the open configuration to the closed configuration: in particular, FIGS. 12 and 13 correspond to the configurations respectively of FIGS. 6 and 7, whilst FIG. 14 shows the unit in the closed configuration; and FIG. 15 shows an intermediate configuration of the unit during the passage from the closed configuration to the open configuration.

With reference to the accompanying drawings, the numeral 1 denotes in its entirety a horizontal unit for making beverages using capsules 2 containing powdered food substances according to this invention.

Figure 1:
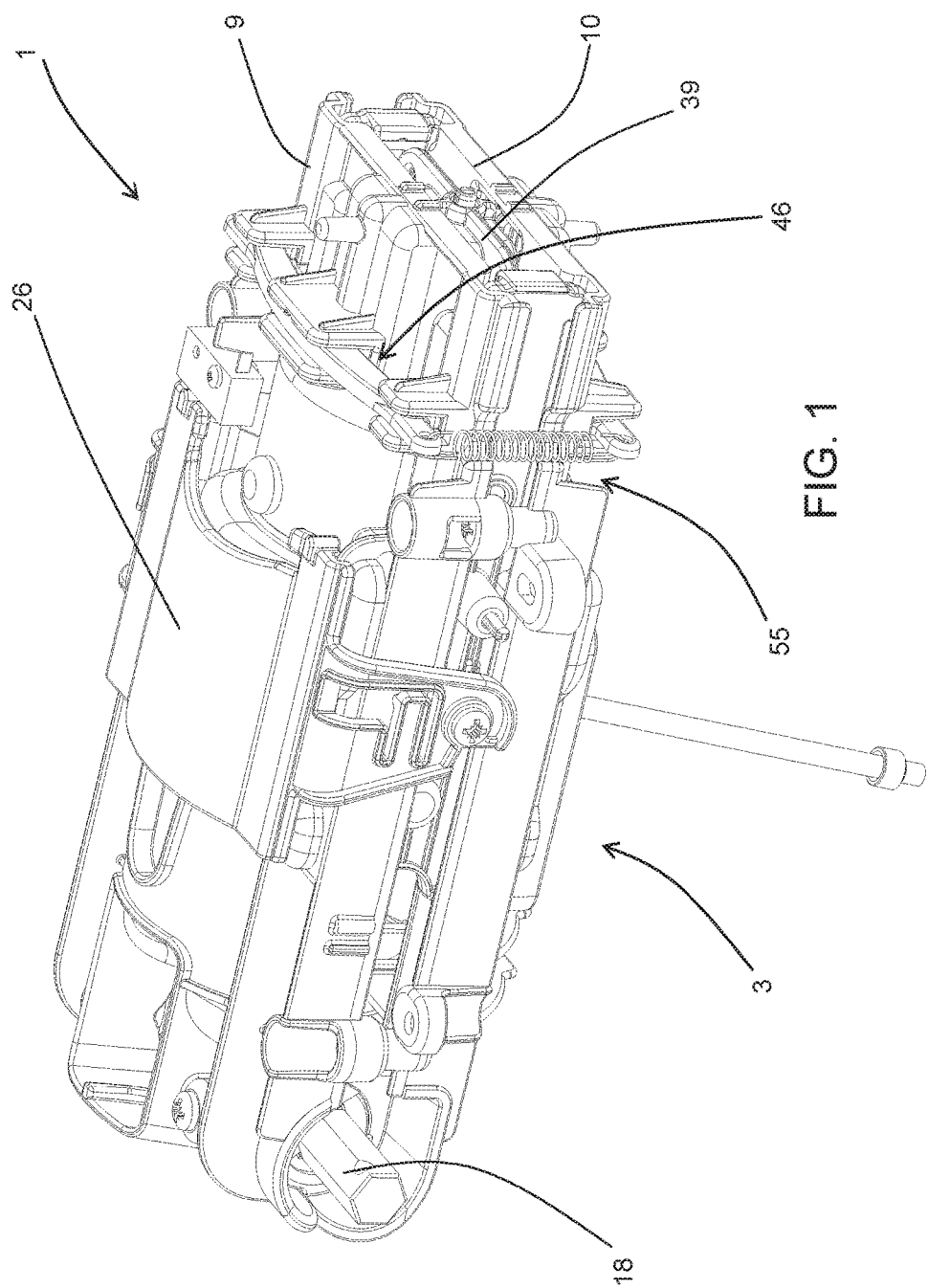
FIG. 1 is an axonometric view of a horizontal unit made in accordance with this invention, in a closed configuration.
Figure 2:
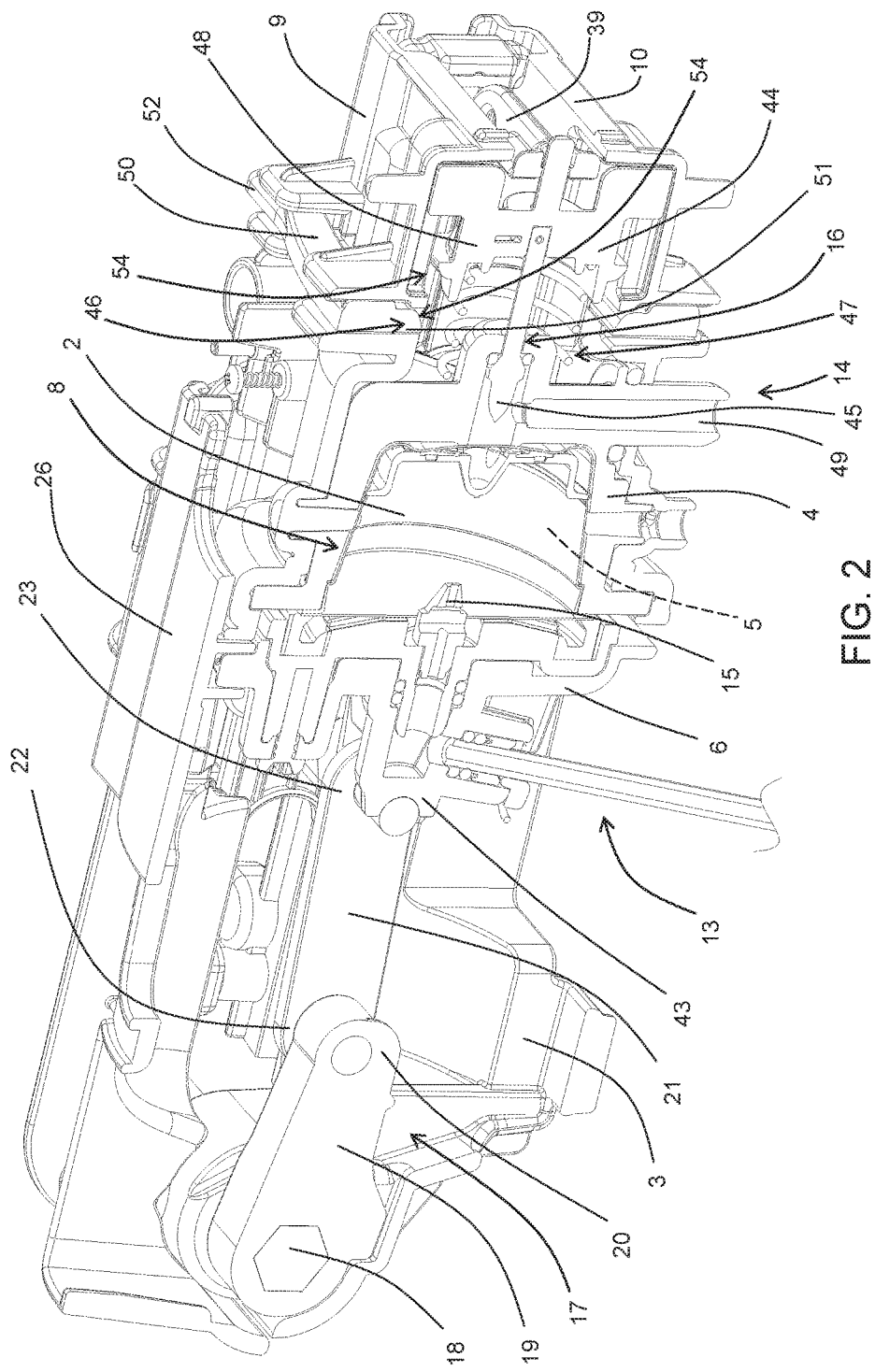
FIG. 2 is a section of the unit of FIG. 1 in a vertical axial plane.

The horizontal unit 1 in general comprises a supporting structure 3. Mounted on the structure are at least a first part 4 forming a housing 5 for receiving a capsule 2 containing a powdered food substance to be extracted, and a second part 6 mounted on the supporting structure 3 and shaped like an element for closing the housing 5. It should be noticed that in the preferred embodiment the housing 5 is sized in such a way that it can almost completely receive the capsule 2. In fact, only a radial annular flange 7 of the capsule 2 remains outside the housing 5 (FIGS. 2 and 14).

Figure 3:
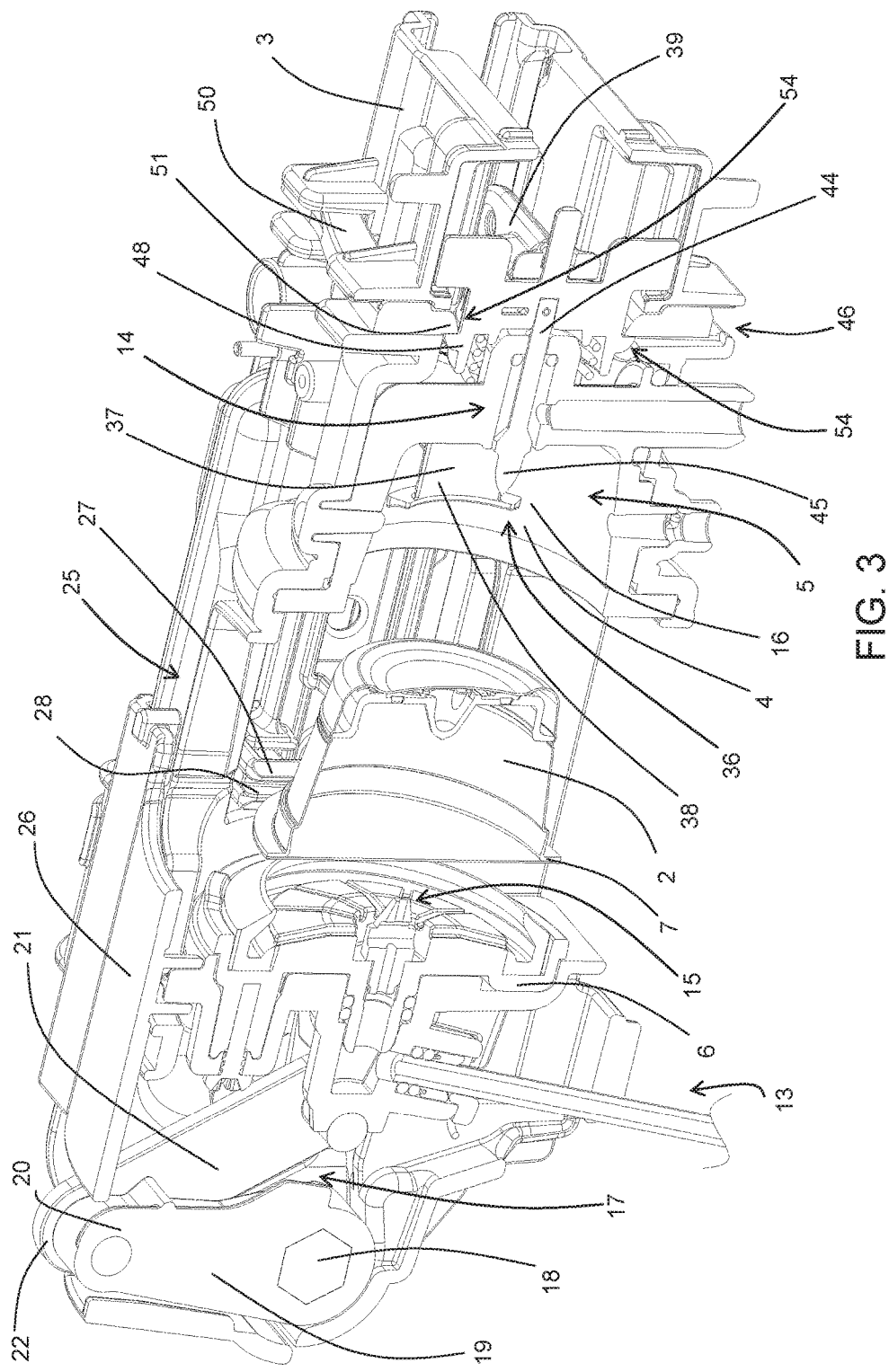
FIG. 3 shows the unit of FIG. 2 in an open configuration with a capsule inserted before supplying.

At least one out of the first part 4 and the second part 6 is mobile relative to the other between an operating position (FIGS. 2 and 14) and an insertion position (FIGS. 3 and 9). In the operating position the two parts 4, 6 are coupled and, at the housing 5, between them form an extraction chamber 8 in which the capsule 2 can be retained. In the position for insertion of the capsule 2, the two parts 4, 6 are distanced and allow the capsule 2 to be positioned between them. The two parts 4, 6 are mobile relative to one another substantially along an axial line parallel with a central axis of the housing 5 which, in use, corresponds to a central axis of the capsule 2. Moreover, in use, the axial line is positioned substantially horizontally.

In the preferred embodiment illustrated in the accompanying drawings, in particular, the first part 4 is fixed relative to the supporting structure 3, whilst the second part 6 moves relative to the supporting structure 3 and relative to the first part 4. In more detail, the supporting structure 3 comprises an upper shell 9 and a lower shell 10 which are coupled to one another and between them form a guide slit 11 parallel with the axial line, and to which the mobile second part 6 is slidably coupled (by elongate arms 12 parallel with the slit 11 and described in more detail below).

The unit 1 also comprises water injection means 13 and beverage collection means 14 operatively associated with the chamber 8 for, respectively, in use sending water into the capsule 2 contained in the chamber 8 and collecting a beverage coming out of the capsule 2. The water injection means 13 and the beverage collection means 14 are advantageously associated one with the first part 4 and the other with the second part 6, and, depending on requirements, they may comprise piercing means 15 for the lid and/or perforating means 16 for the bottom of the capsule 2 (both in the embodiment illustrated). However, the particular structure of the perforating means 16, which is the main aspect of this invention, is described in more detail below, after describing the other parts of the unit.

In general, the unit 1 according to this invention comprises movement means 17 for reciprocal movement of the two parts 4, 6 mounted between the supporting structure 3 and at least the mobile part out of the first part 4 and the second part 6 (the second part 6 in the embodiment illustrated).

Advantageously, the reciprocal movement means 17 comprise a movement shaft 18 rotatably connected to the supporting structure 3, which is positioned perpendicularly to the axial line and which, in use, is positioned substantially horizontal, as well as a crank 19 comprising an inner end fitted on the shaft 18 and an outer end 20, and a connecting rod 21 comprising a rear end 22 rotatably connected to the outer end 20 of the crank and a front end 23 rotatably connected to the mobile part out of the first part 4 and the second part 6 (therefore to the second part 6 in the embodiment illustrated). Depending on requirements, the movement means 17 may be manually operated (using a lever fixed to the movement shaft 18) or motor-driven (by a motor, also coupled to the movement shaft 18).

Since it is a horizontal unit 1, in the insertion position the first part 4 and the second part 6 are distanced along the axial line and the unit 1 comprises retaining means 24 for retaining a capsule 2 at a retaining zone which is interposed between the first part 4 and the second part 6 when said parts are in the insertion position. In fact, the capsule 2 can be inserted in the unit 1 from above, for example through an opening 25 made in the upper shell 9 (an opening 25 which can be selectively closed by a mobile panel 26 fixed to the mobile part, when the first part 4 and the second part 6 are in the operating position).

The retaining means 24 in general, and in the known way, are switchable between a first configuration in which they can retain a capsule 2 (which can reach them thanks to the effect of gravity), and a second configuration in which they cannot retain a capsule 2.

Figure 4:
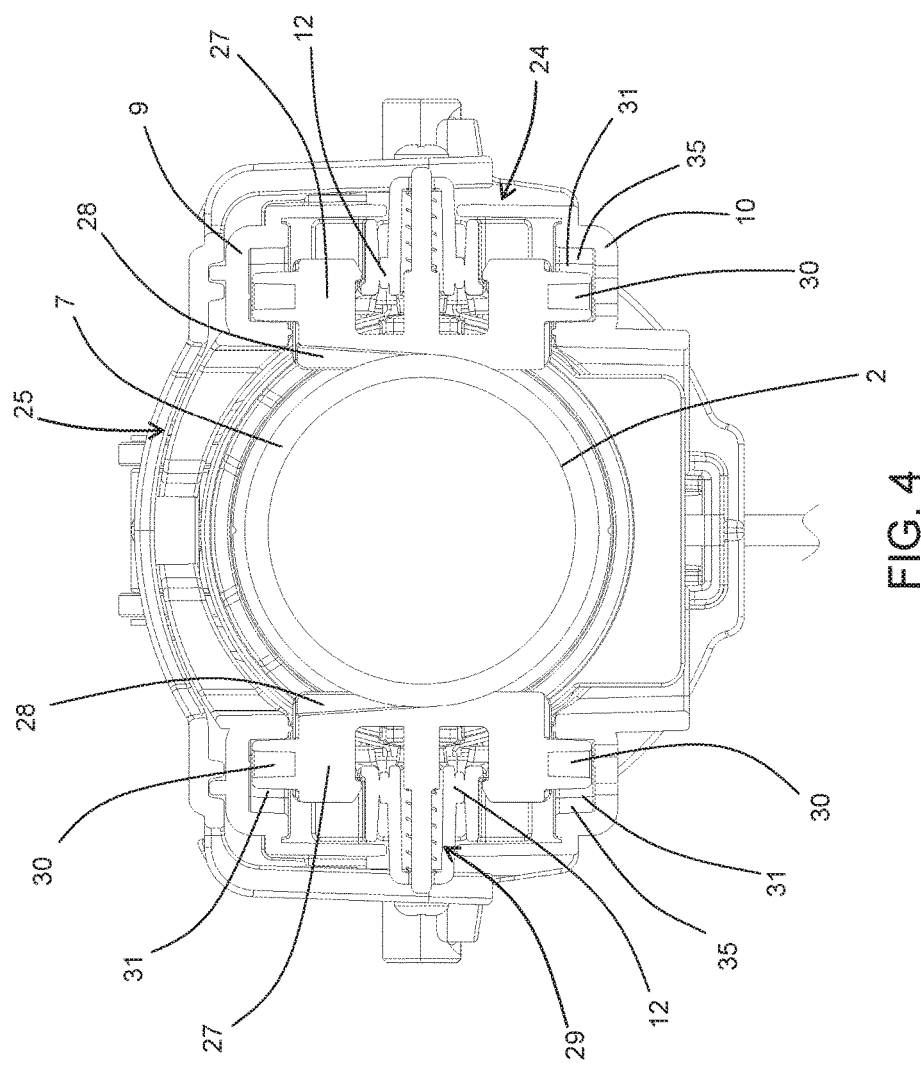
FIG. 4 is a section of the unit of FIG. 3 according to the line IV-IV of FIG. 9.

Advantageously, the retaining means 24 comprise two opposite guide elements 27, each forming a seat 28 facing towards the seat 28 of the other guide element 27, and designed to house a portion of the capsule 2. In the preferred embodiment each seat 28 is constituted of a channel extending mainly vertically, the lower part of it converging towards the other seat 28, and in which the radial annular flange 7 of the capsule 2 can be inserted (FIG. 4).

In the preferred embodiment the guide elements 27 are mobile between the first configuration and the second configuration, and vice versa, by means of a movement respectively away from and towards one another (at least partly) in a divarication plane substantially orthogonal to the axial line (and therefore, in use, vertical).

In the second configuration, the guide elements 27 are also at least partly further apart than when they are in the second configuration.

Moreover, in the embodiment illustrated, the retaining means 24 move with the second part 6, for inserting the capsule 2 in the housing 5 and subsequently leaving it free before the first part 4 and the second part 6 reach the operating position. In fact, during the movement of the first part 4 and/or of the second part 6 from the insertion position to the operating position, the retaining means 24 advantageously remain in the first configuration at least until the capsule 2 is at least mainly inserted in the housing 5, after which they pass to the second configuration.

According to a preferred embodiment illustrated in the accompanying drawings, each guide element 27 is slidably associated with the second part 6 along a divarication line which lies in the divarication plane and which, in use, is substantially horizontal, and the retaining means 24 also comprise auxiliary elastic means 29 mounted between each guide element 27 and the second part 6 for pushing the guide element 27 towards the first configuration.

Figure 8:
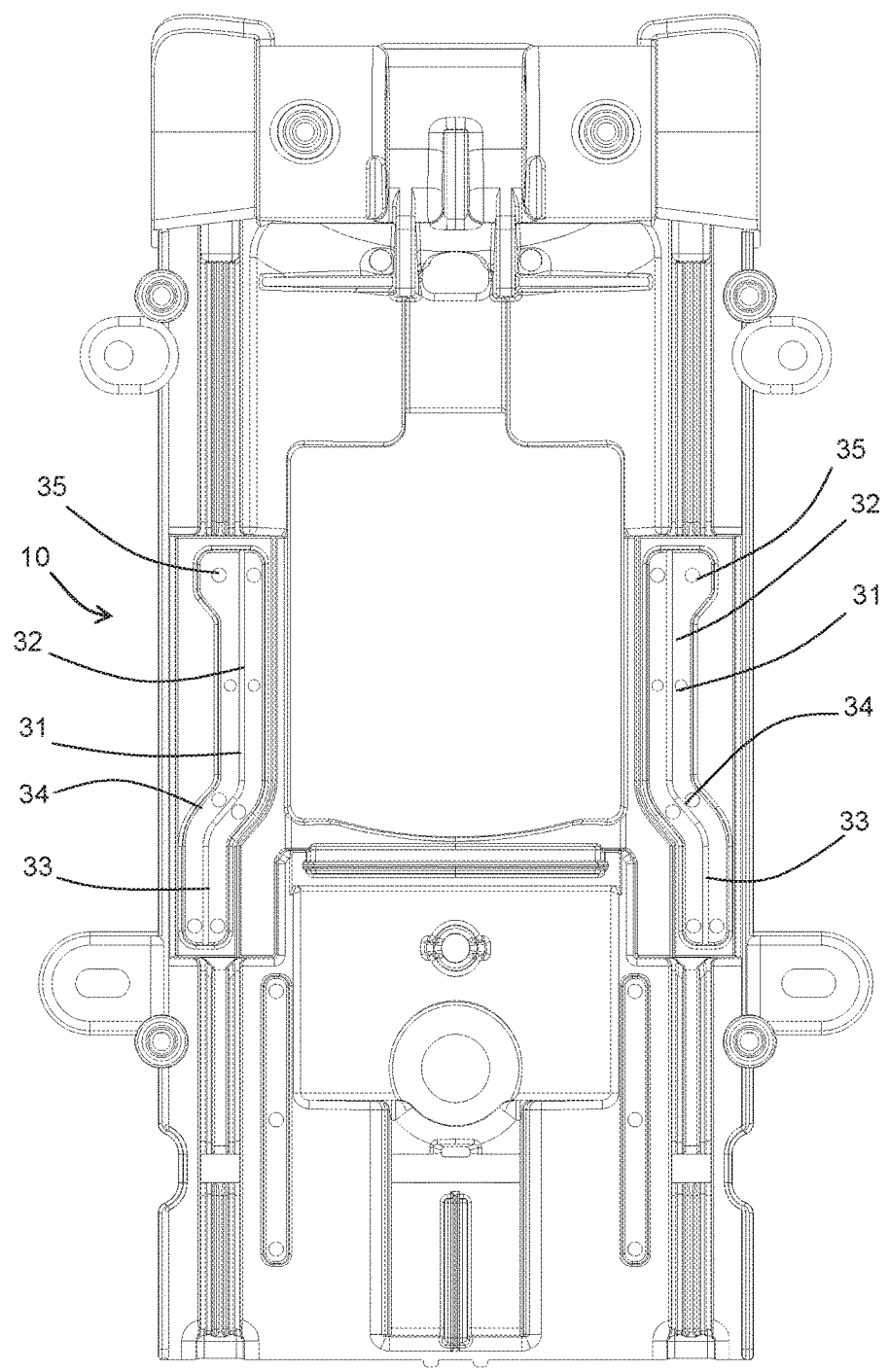
FIG. 8 is a top view of a lower shell of the unit of FIG. 1.

Furthermore, each guide element 27 comprises at least one follower foot 30 (advantageously two, one upper and one lower) slidably coupled to a sliding track 31 which is in turn fixed relative to the first part 4 (and which is therefore stationary in the embodiment illustrated). The movement of the first part 4 and/or of the second part 6 between the operating position and the insertion position causes the relative sliding of the follower foot 30 and the sliding track 31. The sliding track 31 is also cam-shaped to cause the passage of the related guide element 27 from the first configuration to the second configuration and vice versa respectively after the movement of the first part 4 and/or the second part 6 from the insertion position to the operating position and vice versa. As shown in FIG. 8 (illustrating only the lower shell 10) each sliding track 31 advantageously comprises a distal stretch 32 (further from the first part 4) and a proximal stretch 33 (closer to the first part 4) which extend parallel with the axial line and are connected by an angled stretch 34. The distal stretches 32 of each sliding track 31 are also closer to one another than the proximal stretches 33 are. Consequently, when the follower feet 30 are in the distal stretches 32 the guide elements 27 are in the first configuration, whilst when the follower feet 30 are in the proximal stretches the guide elements 27 are in the respective second configurations.

Moreover, advantageously, the sliding track 31 is substantially shaped to match the follower foot 30, so as to guide it in the best possible way. However, in the embodiment illustrated in which the auxiliary elastic means 29 push the guide elements 27 towards the first configuration (and therefore towards the axial line), each sliding track 31 may advantageously comprise an enlargement 35 at its located end on the distal stretch 32 (where the follower foot 30 is positioned when the first part 4 and the second part 6 are in the insertion position). In fact, thanks to this measure, at the retaining zone the two guide elements 27 can be manually spread apart to unload the capsule 2 from the unit 1 without having to close and re-open the unit 1 (it may be sufficient to press on the capsule 2 from above to spread apart the guide elements 27).

It should be noticed that what is described above relative to the retaining means 24 and their movement by means of the sliding tracks 31 may also have applications independent of the other technical aspects described in this patent application. Therefore, it could form the subject matter of a specific divisional patent application relating only to those aspects.

The horizontal unit 1 also comprises ejection means 36 for ejecting the capsule 2 from the housing 5, which act when the first part 4 and the second part 6 move from the operating position to the insertion position, and which are separate from the retaining means 24.

In the embodiment illustrated, the ejection means 36 comprise at least one pusher 37 slidably associated with the first part 4 and equipped with a head 38 positioned at the chamber 8 and an actuator portion 39 positioned outside the chamber 8 (and advantageously outside the first part 4). The pusher 37 is mobile between a first position in which the head 38 allows the insertion of a capsule 2 in the housing 5 and a second position in which the head 38 prevents the insertion of a capsule 2 in the housing 5. During the passage from the first position to the second position the head 38 in use causes the capsule 2 to be ejected from the housing 5, since when it is in the first position it occupies a space inside the housing 5 where the capsule 2 is located with the chamber 8 closed and advantageously keeps the centre of gravity of the capsule 2 outside the housing 5.

The movement of the pusher 37 is guaranteed by at least one actuator element 40 which is fixed to the second part 6 and can be coupled to the actuator portion 39 at least during part of the movement of the first part 4 and/or the second part 6 from the operating position to the insertion position. In fact, during the movement of the first part 4 and/or the second part 6 from the operating position to the insertion position, the actuator element 40 moves the pusher 37 from the first position to the second position to eject the capsule 2 contained in the chamber 8.

In the preferred embodiment, the movement of the first part 4 and/or the second part 6 from the operating position to the insertion position occurs along a trajectory comprising a first stretch extending from the operating position to a first intermediate position and along a second stretch extending from the intermediate position to the insertion position. During that movement the actuator element 40 in the first stretch is uncoupled from the actuator portion 39 and moves relative to the actuator portion 39, in the intermediate position it couples to the actuator portion 39 of the pusher 37 positioned in the first position, and in the second stretch it moves the pusher 37 from the first position to the second position. Preferably, in the second stretch the actuator element 40 rests against the actuator portion 39 and pushes it towards its first position.

The movement of the first part 4 and/or the second part 6 from the insertion position to the operating position advantageously takes place along an opposite trajectory to the movement from the operating position to the insertion position, instead initially travelling along the second stretch and then the first stretch. In the preferred embodiment, to facilitate insertion of the capsule 2 in the housing 5, during that movement the actuator element 40 in the second stretch is advantageously coupled to the actuator portion 39 and moves the pusher 37 from the second position to the first position, whilst in the subsequent first stretch it is uncoupled from the actuator portion 39 and moves relative to the actuator portion 39.

For that purpose, in the preferred embodiment the actuator element 40 and the actuator portion 39 comprise one a magnet 41 and the other a ferromagnetic element 42, which are positioned in such a way that the magnet 41 can retain the ferromagnetic element 42 when the actuator element 40 is in contact with the pusher 37. In this way, during the movement from the insertion position to the operating position along the second stretch, the actuator element 40 pulls the pusher 37 thanks to the magnetic attraction applied by the magnet 41 to the ferromagnetic element 42. In contrast, that pulling stops in the first stretch, since at the intermediate position the actuator portion 39 reaches its end of stroke and the subsequent movement relative to the actuator element 40 causes uncoupling of the magnet 41 from the ferromagnetic element 42 (FIG. 10).

In the preferred embodiment, the second part 6 comprises at least one elongate arm 12 elongate along a line substantially parallel with the axial line, extending at least partly alongside the first part 4 and comprising a free end which can be coupled to the coupling portion and which constitutes the actuator element 40. In particular, the free end extends perpendicularly relative to the rest of the arm adjacent to it, and towards the central axis.

However, advantageously, the horizontal unit 1 comprises at least two actuator elements 40 fixed to the second part 6, which are positioned at two opposite sides of the second part 6, each couplable to a different part of the actuator portion 39. In the embodiment illustrated, in particular, the second part 6 comprises two elongate arms 12 elongate along the line substantially parallel with the axial line and extending at least partly at two opposite sides of the first part 4 at least when the first part 4 and the second part 6 are in the operating position (in the accompanying drawings they partly always are), and which each comprise a free end couplable to the coupling portion and which constitutes the respective actuator element 40. Moreover, in the case illustrated, the two arms are substantially specular and the guide elements 27 are slidably mounted along the divarication line, one on each elongate arm 12.

In the preferred embodiment, the pusher 37 comprises at least two heads 38 which are positioned at the chamber 8 (advantageously in a position such that they act against the bottom of the capsule 2) and connected to the actuator portion 39 which in turn extends mainly transversally to the central axis (in the horizontal plane). In fact, as can be seen in FIG. 15, the actuator portion 39 extends in the horizontal plane in a C shape and with the ends of the C projecting outwards relative to the central axis and connectable to the actuator elements 40.

As can be seen in FIG. 9, the second part 6 comprises a main body 43 which in the operating position closes the housing 5 and on which the injection means are at least partly mounted. The main body 43 is rotatably connected both to the front end 23 of the connecting rod 21 of the reciprocal movement means 17 and to the two elongate arms 12. The correct orientation of the main body 43 relative to the line of movement is guaranteed by its additional connection to the mobile panel 26 which is in turn slidably guided on the upper shell.

As already indicated, the innovative aspect of this invention relates to the above-mentioned beverage collection means 14 and the perforating means 16 for perforating the bottom of the capsule 2 which are part of them.

According to this invention, they comprise at least one perforating element 44 mobile between an active position in which in use it can interfere with a capsule 2 inserted in the housing 5 to perforate it (FIG. 5), and an inactive position in which it is retracted relative to the active position and in which, in use, it is distanced from the bottom of a capsule 2 inserted in the chamber 8 (FIG. 2). Preferably, the perforating element 44 comprises at least one blade 45 extending in a plane parallel with the central axis and which is therefore able to make a linear cut in the bottom of the capsule 2. Advantageously, the perforating element 44 is mobile parallel with the central axis.

Furthermore, the beverage collection means 14 comprise hooking means 46 operatively associated with the first part 4, which are switchable between a hooking configuration and an unhooking configuration. When they are in the hooking configuration, the hooking means 46 they retain the perforating element 44 in the active position, whilst when they are in the unhooking configuration they allow movement of the perforating element 44 from the active position towards the inactive position.

As shown in FIGS. 3 and 9, when the first part 4 and the second part 6 are in the insertion position, the perforating means 16 are in the active position and the hooking means 46 are in the hooking configuration, whilst, as shown in FIGS. 2, 7 and 14, when the first part 4 and the second part 6 are in the operating position, the perforating means 16 are in the inactive position and the hooking means 46 are preferably in the unhooking configuration (although they could even be in the hooking configuration).

First elastic means 47 operatively act on the perforating element 44 to push it towards the inactive position. The first elastic means 47 are advantageously constituted of a helical spring positioned between the first part 4 and a base portion 48 of the perforating element 44 which is outside the first part 4. The blade 45 is fixed to the base portion 48 and is inserted slidably and in a sealed fashion in a through hole which communicates with the drainage channel 49 for the beverage coming out of the capsule 2.

Advantageously, during the movement of the first part 4 and/or the second part 6 from the insertion position to the operating position, close to or at the operating position the second part 6 switches the hooking means 46 from the hooking configuration to the unhooking configuration, whilst, during the movement of the first part 4 and/or the second part 6 from the operating position to the insertion position, the second part 6 moves the perforating element 44 from the inactive position to the active position.

Figure 5:
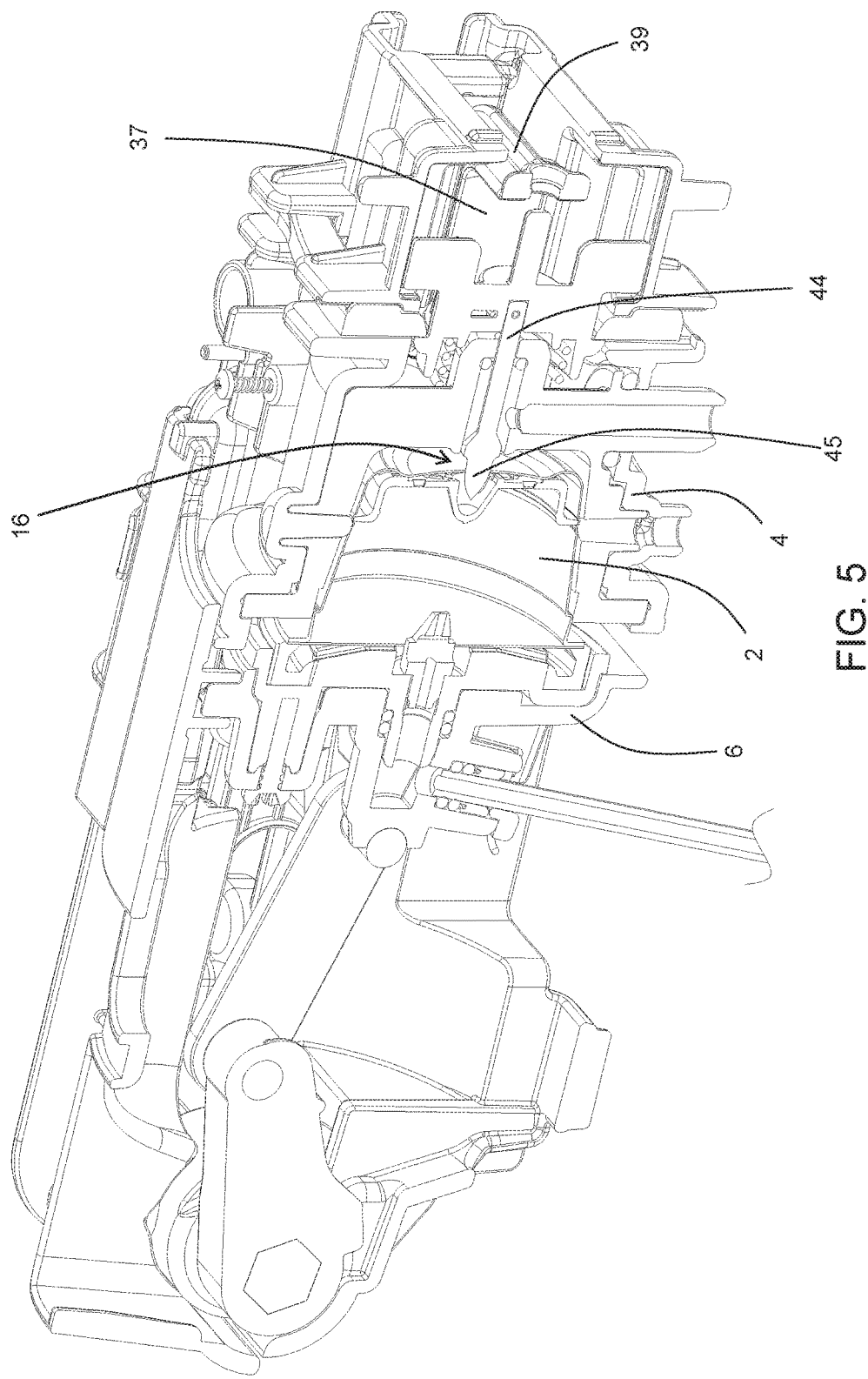
FIG. 5 shows the unit of FIG. 3 in a subsequent intermediate configuration during closing.

In the preferred embodiment, the hooking means 46 comprise at least one shaped body 50 which is elongate along a line transversal to the axial line and which comprises a central portion which in turn comprises at least one hooking tooth 51 and two ends 52. The hooking tooth 51 is couplable to the perforating element 44 positioned in the hooking configuration, for keeping it in that configuration (FIG. 5). In contrast, the two ends 52 of the shaped body 50 are operatively connected to the second part 6. In particular, in the embodiment illustrated, the two ends 52 are slidably coupled to the second part 6 for sliding on it during the movement between the operating position and the insertion position (FIGS. 6 and 7). In particular, in the preferred embodiment, each end 52 of the shaped body 50 interacts with one of the elongate arms 12 of the second part 6, and it is the latter which move the shaped body 50 from the hooking position to the unhooking position.

In turn, the shaped body 50 is slidably associated with the first part 4 according to a sliding line substantially orthogonal both to the axial line and said transversal line (advantageously it is, therefore, in use, a vertical line). The shaped body 50 can therefore be moved between a hooking position which corresponds to the hooking configuration of the hooking means 46 and an unhooking position which corresponds to the unhooking configuration of the hooking means 46.

In more detail, each end of the shaped body 50 is slidably associated with one of the elongate arms 12 (rests on it according to a resting line parallel with the sliding line), and the arms each comprise a resting face on which at least one raised zone 53 is made which rises according to a line parallel with the sliding line (in contrast, outside of the raised zone 53 the resting face has a uniform profile, in the same relative position, in every plane transversal to the axial line). The raised zones 53 in turn are all the same in terms of planes perpendicular to the axial line. In this way, as a whole the raised zones 53 are designed to cause the movement of the shaped body 50 from the hooking position to the unhooking position when they interact with the ends 52 of the shaped body 50 (according to the methods indicated in more detail below).

Preferably, the shaped body 50 and/or the perforating element 44 comprise a shaped portion 54 substantially comprising a surface set at an angle to the line of movement of the perforating element 44 between the active position and the inactive position. During movement of the perforating element 44 from the inactive position to the active position, the perforating element 44 and the shaped body 50 interact at the shaped portion 54 to cause the passage of the shaped body 50 from the hooking position to the unhooking position.

Furthermore, the hooking means 46 comprise second elastic means 55 operatively acting on the shaped body 50 to push it towards the hooking position and to hold its ends 52 in contact with the elongate arms 12.

As is clearly shown in the accompanying drawings, in the preferred embodiment the hooking means 46 comprise two shaped bodies 50 mounted opposite one another along the sliding line and respectively close to and distanced from one another when they are both in the respective positions, respectively hooking and unhooking. The second elastic means 55 comprise two helical springs mounted between corresponding ends 52 of the shaped bodies 50 to pull them towards each other. Consequently, on one hand the shaped bodies 50 act one above and one below the perforating element 44, and on the other hand their ends 52 are coupled one above and one below the respective elongate arm 12, which comprises two raised zones 53 which extend one downwards and one upwards (above, below, up and down are to be understood with reference to the position of the unit 1 in use).

Obviously, this invention also relates to a machine for making beverages by passing hot water through capsules 2 containing powdered food substances, which comprises a horizontal unit 1 of the type described above. Said machine may, in the known way, comprise means for feeding water to the injection means, means for dispensing the beverage at the outfeed of the collection means, etc.

Operation of the unit 1 according to this invention derives from the description of the structure above.

When the first part 4 and the second part 6 are in the insertion position (FIGS. 3 and 9), the mobile panel 26 leaves free the opening 25 through the upper shell 9, and it is possible to insert a capsule 2 through it.

Thanks to gravity, the capsule 2 inserted in this way reaches the retaining means 24 which are positioned in the first configuration thanks to the insertion of the follower feet 30 in the distal stretch 32 of the related sliding tracks 31 and the action of the auxiliary elastic means 29. The upper radial flange of the capsule 2 is inserted in the channels and the capsule 2 stops between the first part 4 and the second part 6 (FIG. 4).

At that point the reciprocal movement means 17 are operated, moving the first part 4 and the second part 6 into the operating position (FIGS. 2 and 14).

Thanks to the interaction of the magnets with the ferromagnetic elements (FIG. 9), the movement of the first part 4 and/or of the second part 6 from the insertion position towards the operating position initially causes the movement of the pusher 37 from the second position to the first position. However, when the intermediate position is reached, the actuator elements 40 are uncoupled from the actuator portion 39 which has reached the end of its stroke, and they continue their movement (FIGS. 10 and 11).

Moreover, during chamber 8 closing, the follower feet 30 slide along the sliding tracks 31 until they reach the proximal stretches (FIG. 12), therefore causing the guide elements 27 to move into the second configuration and the release of the capsule 2 in the housing 5.

Moreover, during unit 1 closing, the bottom of the capsule 2 and if necessary the lid are also pierced (FIGS. 11 and 12). In particular, according to the preferred embodiment of this invention illustrated in the accompanying drawings, during capsule insertion in the housing, the bottom of the capsule is pressed (by the retaining means and/or the second part) against the perforating element 44 which penetrates it and therefore creates the hole which allows the beverage to flow out. Once the bottom has been perforated, and just before reaching the operating position, the ends 52 of the shaped body 50 are adjacent to the raised zones 53 of the arms (FIG. 6). The subsequent relative movement between the second part 6 and the first part 4 lifts the ends 52 on the raised zones 53 (FIG. 7) which therefore cause the shaped bodies 50 to be spread apart and in turn disengage from the perforating element 44 (FIG. 13). The latter, at that point being free, is then pushed towards the inactive position by the first elastic means 47 (FIG. 14), and disengages from the perforated bottom of the capsule 2 through which the beverage can then flow out.

Finally, when capsule 2 extraction has finished, the reciprocal movement means 17 move the first part 4 and/or the second part 6 from the operating position to the insertion position. Consequently, the actuator elements 40 initially slide relative to the actuator portion 39, but in the intermediate position they engage with the actuator portion 39 (FIG. 16) and from that moment onwards they push the pusher 37 from the first position to the second position. The heads 38 of the pusher 37 therefore act on the bottom of the capsule 2, ejecting it from the housing 5.

This invention brings important advantages.

In fact, the bottom perforating means according to this invention on one hand guarantee certain piercing of the capsule during the insertion step, and on the other hand, particularly if they use a blade, they allow the same quality benefits as described in patent EP 2000063.

Finally, it should be noticed that this invention is relatively easy to produce and that even the cost linked to implementing the invention is not very high.

The invention described above may be modified and adapted in several ways without thereby departing from the scope of the inventive concept.

Moreover, all details of the invention may be substituted with other technically equivalent elements and the materials used, as well as the shapes and dimensions of the various components, may vary according to requirements.

LEGEND horizontal unit 1
capsule 2
supporting structure 3
first part 4
housing 5
second part 6
annular flange 7
extraction chamber 8
upper shell 9
lower shell 10
slit 11
elongate arms 12
water injection means 13
beverage collection means 14
piercing means 15
perforating means 16
movement means 17
movement shaft 18
crank 19
outer end 20
connecting rod 21
rear end 22
front end 23
retaining means 24
opening 25
panel 26
guide elements 27
seat 28
auxiliary elastic means 29
follower foot 30
sliding track 31
distal stretch 32
proximal stretch 33
angled stretch 34
enlargement 35
ejection means 36
pusher 37
head 38
actuator portion 39
actuator element 40
magnet 41
ferromagnetic element 42
main body 43
perforating element 44
blade 45
hooking means 46
first elastic means 47
base portion 48
channel 49
shaped body 50
hooking tooth 51
end 52
raised zone 53
shaped portion 54
second elastic means 55

The invention claimed is:
1. A horizontal unit for making beverages using capsules containing powdered food substances, comprising:
a supporting structure (3);

at least a first part (4) mounted on the supporting structure (3) and forming a housing (5) for receiving a capsule (2) containing a powdered food substance to be extracted;

a second part (6) mounted on the supporting structure (3) for closing the housing (5), at least one out of the first part (4) and the second part (6) being horizontally mobile relative to the other between an operating position in which the two parts are coupled and, at the housing (5), between them form an extraction chamber (8) in which the capsule (2) can be retained, and a capsule (2) insertion position in which they are distanced and allow said capsule (2) to be positioned between them; the two parts (4, 6) being mobile relative to each other along an axial line parallel with a central axis of said housing (5) and which in use is positioned horizontally;

water injection means (13) and beverage collection means (14) operatively associated with the chamber (8) for, respectively, in use sending water into the capsule (2) contained in the chamber (8) and collecting a beverage coming out of the capsule (2);

movement means (17) for reciprocal movement of the two parts (4, 6) mounted between the supporting structure (3) and the at least one mobile part out of the first part (4) and the second part (6);

retaining means (24) for retaining a capsule (2) interposed between the first part (4) and the second part (6) when the latter are positioned in the insertion position; and ejection means (36) for ejecting the capsule (2) from the housing (5) when the first part (4) and the second part (6) move from the operating position to the insertion position;

characterised:

in that the beverage collection means (14) comprises perforating means (16) for perforating the bottom of the capsule (2), in turn comprising at least one perforating element (44) mobile between an active position in which in use it can interfere with a capsule (2) inserted in the housing (5) to perforate it, and an inactive position in which it is retracted relative to the active position and in which, in use, it is distanced from the bottom of a capsule (2) inserted in the chamber (8);

in that the beverage collection means (14) comprises hooking means (46) operatively associated with the first part (4) and switchable between a hooking configuration in which it retains the perforating element (44) in the active position and an unhooking configuration in which it allows the movement of the perforating element (44) from the active position; wherein when the first part (4) and the second part (6) are in the insertion position, the perforating means (16) is in the active position and the hooking means (46) is in the hooking configuration;

in that the beverage collection means (14) comprises first elastic means (47) operatively acting on the perforating element (44) for pushing it towards the inactive position;

and in that during a movement of the first part (4) and/or the second part (6) from the insertion position to the operating position, the second part (6) switches the hooking means (46) from the hooking configuration to the unhooking configuration;

and in that during a movement of the first part (4) and/or the second part (6) from the operating position to the insertion position, the second part (6) moves the perforating element (44) from the inactive position to the active position.

2. The horizontal unit according to claim 1, characterised in that the perforating element (44) comprises at least one blade (45).

3. The horizontal unit according to claim 1 or 2, characterised in that the hooking means (46) comprises at least one shaped body (50), elongate along a line transversal to the axial line and comprising a central portion which comprises at least one hooking tooth (51) couplable to the perforating element (44) in the hooking configuration for keeping it in that configuration, and two ends (52) operatively connected to the second part (6), the shaped body (50) also being slidably associated with the first part (4), according to a sliding line orthogonal both to the axial line and said transversal line, between a hooking position corresponding to the hooking configuration and an unhooking position corresponding to the unhooking configuration.

4. The horizontal unit according to claim 3, characterised in that the shaped body (50) and/or the perforating element (44) also comprise a shaped portion (54) substantially comprising a surface set at an angle to a line of movement of the perforating element (44) between the active position and the inactive position, wherein during movement of the perforating element (44) from the inactive position to the active position, the perforating element (44) and the shaped body (50) interact at said shaped portion (54) to cause the passage of the shaped body (50) from the hooking position to the unhooking position.

5. The horizontal unit according to claim 3, characterised in that the hooking means (46) also comprises second elastic means (55) operatively acting on the shaped body (50) to push it towards the hooking position.

6. The horizontal unit according to claim 3, characterised in that the second part (6) comprises two elongate arms (12) elongate along a line parallel with the axial line and extending at least partly at two opposite sides of the first part (4) at least when the first part (4) and the second part (6) are in the operating position, and in that each elongate arm (12) interacts with one of the ends (52) of the shaped body (50) for moving the latter from the hooking position to the unhooking position.

7. The horizontal unit according to claim 6, characterised in that each end (52) of the shaped body (50) is slidably associated with one of said arms (12) and in that the arms (12) each comprise at least one raised zone (53) which rises according to a line parallel with the sliding line, the raised zones (53) being designed to cause the movement of the shaped body (50) from the hooking position to the unhooking position when they interact with the ends (52) of the shaped body (50).

8. The horizontal unit according to claim 3, characterised in that the hooking means (46) comprises two of said shaped bodies (50) mounted opposite one another along said sliding line and respectively close to and distanced from one another when they are both in the respective positions respectively hooking and unhooking.

9. The horizontal unit according to claim 1, characterised in that the ejection means (36) comprises at least one pusher (37) slidably associated with the first part (4) and equipped with a head (38) positioned at the chamber (8) and an actuator portion (39) positioned outside the chamber, the pusher (37) being mobile between a first position in which the head (38) allows the insertion of a capsule (2) in the housing (5) and a second position in which the head (38) prevents the insertion of a capsule (2) in the housing (5), in that the second part (6) acts on the actuator portion (39) to push the pusher (37) into the first position and in that the perforating element (44) is slidably coupled to the pusher (37) for moving relative to it when it passes from the active position to the inactive position and for being moved into the active position by the pusher (37) when the pusher (37) passes from its own first position to the second position.

10. The horizontal unit according to claim 1, characterised in that the first part (4) is fixed relative to the supporting structure (3), in that the second part (6) moves relative to the first part (4), and in that the retaining means (24) move with the second part (6), for inserting the capsule (2) in the housing and subsequently leaving it free before the first part (4) and the second part (6) reach the operating position.

11. A machine for making beverages by passing hot water through capsules containing powdered food substances, characterised in that it comprises a horizontal unit (1) according to claim 1.

\* \* \* \* \*

UNITED STATES PATENT AND TRADEMARK OFFICE
CERTIFICATE OF CORRECTION

PATENT NO. : 10,143,329 B2
APPLICATION NO. : 14/910089
DATED : December 4, 2018
INVENTOR(S) : Franco Casiddu It is certified that error appears in the above-identified patent and that said Letters Patent is hereby corrected as shown below:

In the Claims

Column 12, Line 7, Claim 3, delete "or 2".

Signed and Sealed this
Nineteenth Day of February, 2019

Andrei Iancu
*Director of the United States Patent and Trademark Office*